United States Patent
Barth et al.

(10) Patent No.: US 8,764,298 B2
(45) Date of Patent: Jul. 1, 2014

(54) LOCKING THRUST WASHER

(75) Inventors: Scott Michael Barth, Riverton, UT (US); David Allen Nelson, Riverton, UT (US)

(73) Assignee: Aktiebolaget SKF, Gothenburg (SE)

( * ) Notice: Subject to any disclaimer, the term of this patent is extended or adjusted under 35 U.S.C. 154(b) by 71 days.

(21) Appl. No.: 13/488,486

(22) Filed: Jun. 5, 2012

(65) Prior Publication Data

US 2013/0322797 A1 Dec. 5, 2013

(51) Int. Cl.
*F16C 17/04* (2006.01)

(52) U.S. Cl.
USPC ........................................................ 384/420

(58) Field of Classification Search
USPC ........................................ 384/420–427, 626
See application file for complete search history.

(56) References Cited

U.S. PATENT DOCUMENTS

| | | | | | |
|---|---|---|---|---|---|
| 1,165,655 | A | * | 12/1915 | Eldridge | 384/427 |
| 1,571,047 | A | * | 1/1926 | French | 384/420 |
| 2,871,069 | A | * | 1/1959 | Weber | 384/420 |
| 4,647,228 | A | * | 3/1987 | Jensen et al. | 384/420 |
| 6,502,994 | B2 | * | 1/2003 | Jackson | 384/420 |
| 7,887,240 | B2 | * | 2/2011 | Marathe et al. | 384/420 |

* cited by examiner

*Primary Examiner* — Thomas R Hannon
(74) *Attorney, Agent, or Firm* — Bryan Peckjian; SKF USA Inc. Patent Department

(57) ABSTRACT

An interlocking thrust washer is presented. The thrust washer including a first annular upper ring having first inner and outer side circumferential surfaces and first top and bottom surfaces. The upper ring providing at least two holes that extend therethrough the first top and bottom surfaces and a first annular lower ring having second inner and outer side surfaces and second top and bottom surfaces. The first lower annular ring includes at least two annular projections extending upward from the second top surface. The at least two annular projections align with the at least two holes to create an interlocking fit between the first annular upper and lower rings. The interlocking fit allows the first upper and lower rings to combine and function as the single element thrust washer 10 once interlocked together. The interlocking fit further prevents any rotation between the first upper and lower annular rings during operation.

10 Claims, 11 Drawing Sheets

LOCKING THRUST WASHER

FIELD OF THE INVENTION

The present disclosure generally relates to a thrust washer. More particularly, the present disclosure relates to a thrust washer that is constructed by interlocking upper and lower rings together to effectively construct a single component thrust washer.

BACKGROUND OF THE INVENTION

The present invention provides an interlocking locking thrust washer assembly that functions as a single component. It's a two piece design constructed from separate upper and lower injection molded rings that interlock together. As such, the present invention provides a functional design that is also easy to manufacture.

A thrust washer is typically placed between two moving parts. Thrust washers prevent longitudinal movement and provide a bearing surface for the thrust surfaces of the part. Thrust washers are used as a bearing surface for rotary applications. They are usually made of steel, bronze, plastic, or other material with low friction coefficients. Thrust washers, sometimes called rotary thrust washers, are washers designed to prevent movement along the axis of a shaft. Thrust bearings support an axial load on a shaft. A thrust bearing can be a plate at the end of a shaft, or a device against which a collar on the shaft presses.

Thrust washers can be found in almost every appliance, machine, transportation conveyance, power tool and recreational device that has moving parts, axles, bolts, pins, bearings, and rotating components. In their simplest form, thrust washers are long-wearing flat bearings in the shape of a washer that transmit and resolve axial forces in rotating mechanisms to keep components aligned along a shaft. Thrust washers are an economical alternative to rolling thrust bearings whenever forces velocities are moderate.

Precision-engineered thrust washers are used in high-wear applications such as transmissions, power take-offs, pumps, axle assemblies, motors, and winches. Thrust washer kits contain thrust washers of varying thicknesses for correct installation during component assembly. Standard thrust washers are made for products such as automotive engines.

Figure 1A:
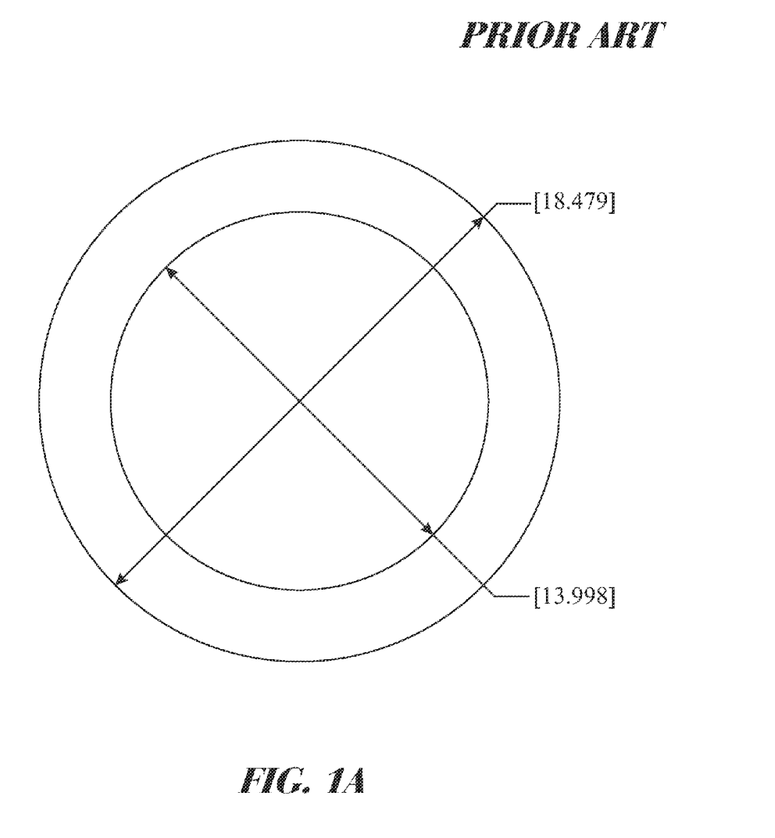
FIG. 1A is a top plan view of a "Prior Art" thrust washer as disclosed in the Background of the Invention.
Figure 1B:
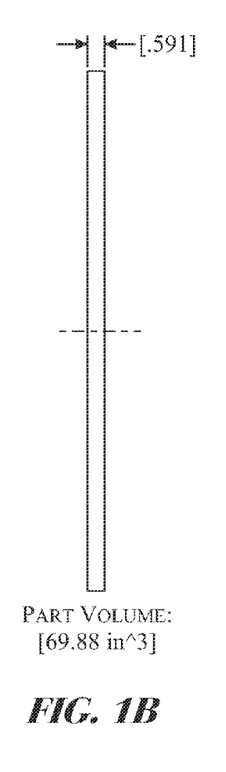
FIG. 1B is a side view of the "Prior Art" thrust washer as disclosed in the Background of the Invention.

There is shown in FIG. 1A a top plan view of an example of a Prior Art thrust washer design. FIG. 1B shows a side view of the same. Manufacturers of specialty thrust washers typically receive specifications from their prospective customers for a new application. As such a thrust washer's geometry, that is, its part thickness, inner and outer diameters and ultimately its volume, typically emanate from specifications necessitated by the customer's application. Since the required part geometry can vary with the application, there are times when the required part size and geometry are such that the part volume is too large for an injection molding machines shot capacity. The factors for determining the proper parameters for injection molding are well documented in numerous books, one of which is entitled "*Injection Molding Handbook*" By Tim A. Osswald, Lih-Sheng Turng, Paul J. Gramann.

Here, the Prior Art thrust washer has an inner diameter of roughly 14 inches and an outer diameter of roughly 18.5 inches. It has a maximum thickness of roughly (0.9) inches and a minimum thickness of roughly (0.6) inches. As such, this part has an internal part volume of roughly 70 cubic inches. In this application, the geometric parameters with respect to its volume are too great for an injection molding machines shot capacity. Consequently, the part can not be made and most likely the business opportunity will be lost.

Figures 2A, 2B:
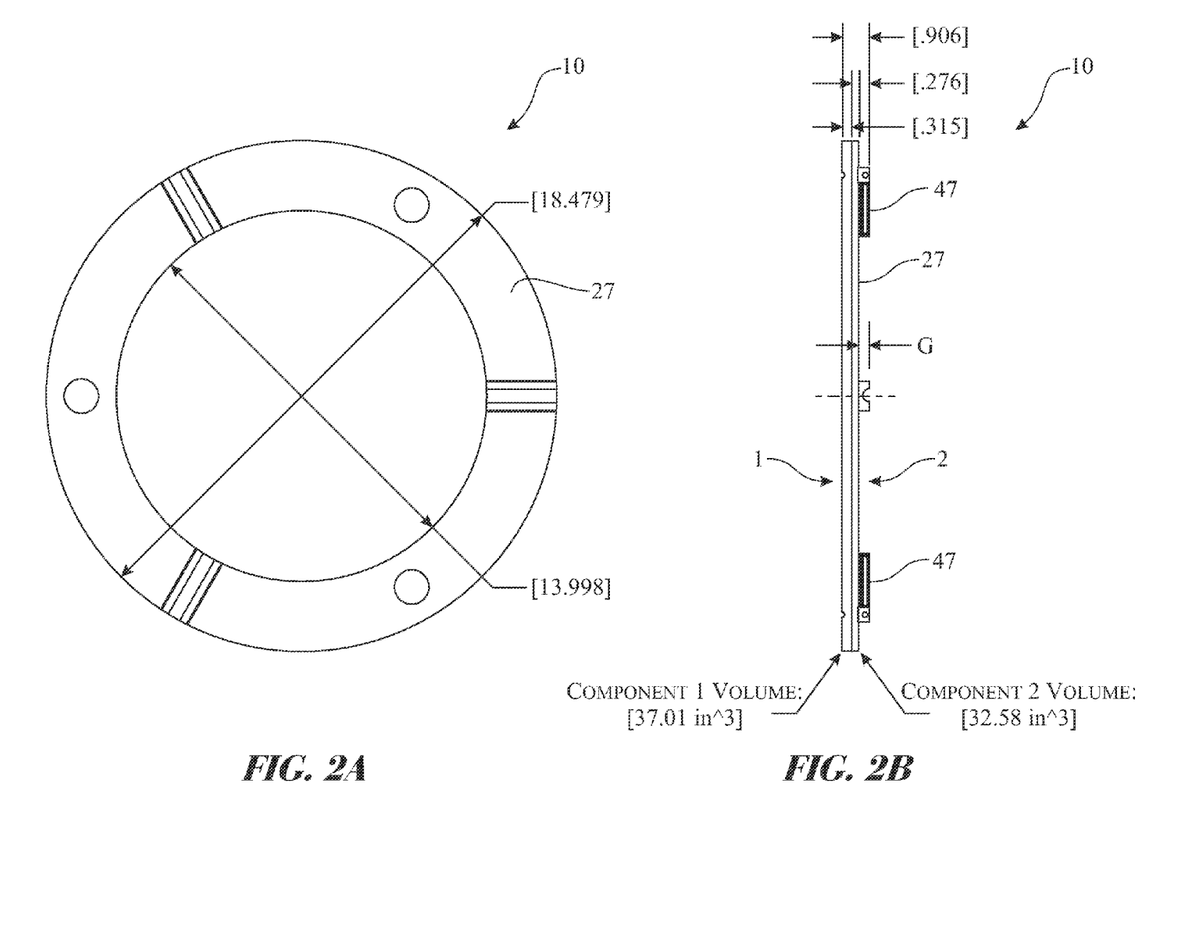
FIG. 2A is a top plan view of a locking thrust washer according to a first preferred embodiment of the present invention.
FIG. 2B is a side view of the locking thrust washer according to the first preferred embodiment of the present invention.

An example of the inventive thrust washer design of the present invention is illustrated in FIGS. 2A-2B. Here, the thrust washer provides component 1 and component 2 with their respective volumes. The volume of each component 1, 2 is roughly half of the prior art thrust washers total volume. This allows the two components 1, 2 to be injection molded without exceeding the machines shot capacity. The present invention meets the design requirements of the customer without exceeding the molding machines shot capacity by splitting the single ring design into two rings thus providing a functional design that is easy to manufacture.

SUMMARY OF THE INVENTION

The basic inventive concept provides a locking thrust washer having two interlocking rings.

A first aspect of the present invention provides a locking thrust washer 10 comprising:
A first annular upper ring having:
first inner and outer side circumferential surfaces;
first top and bottom surfaces; and
at least two holes extending therethrough the first top and bottom surfaces; and
a first annular lower ring having:
second inner and outer side surfaces;
second top and bottom surfaces; and
at least two annular projections extending upward from the second top surface; and wherein
the at least two annular projections align with the at least two holes to create an interlocking fit between the first annular upper and lower rings; and wherein
the interlocking fit allows the first upper and lower rings to combine and function as the single element thrust washer once interlocked together; and wherein
the interlocking fit further prevents any rotation between the first upper and lower annular rings during operation.

In a second aspect of the present invention the second bottom surface is a wearing surface.

In a third aspect of the present invention the first upper annular ring includes at least two standoffs for providing a gap.

In another aspect of the present invention the standoffs further include two rectangular projections and a first trough that connects and is disposed between the rectangular projections.

In yet another aspect of the present invention the gap is formed between the first top surface and outer surfaces of the standoff.

In yet another aspect of the present invention the at least two holes on the upper annular ring and the at least two annular projections on the lower annular ring are equidistantly spaced apart on their respective first top and bottom and second top and bottom surfaces.

In yet another aspect of the present invention the at least two holes on the first upper ring and at least two buttons on the first lower ring are radially centered between their respective first and second inner and outer side surfaces.

In yet another aspect of the present invention the upper and lower rings are injection molded and fabricated out of a glass filled nylon material.

In yet another aspect of the present invention the first bottom surface and second top surface are at least one of heat welded and solvent welded and press fit together.

In yet another aspect of the present invention the second bottom surface further provides at least one second trough for lubrication passage.

In yet another aspect of the present invention and based on the thrust washers geometry and volume, an injection molding machine's shot capacity is not exceeded.

In a final aspect of the present invention a locking thrust washer comprising:
  a second annular upper ring having:
    third inner and outer side surfaces;
    third top and bottom surfaces; and
    at least two slots at least partially extending radially through the third bottom surface; and
  a second annular lower ring having:
    fourth inner and outer side surfaces;
    fourth top and bottom surfaces; and
    at least two rectangular projections at least partially extending upward from the third top surface; and wherein
  the at least two rectangular slots align with the at least two rectangular projections to create an interlocking fit between the annular upper and lower rings; and wherein
  the interlocking fit allows the two ring assembly to function as a single element thrust washer once installed.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
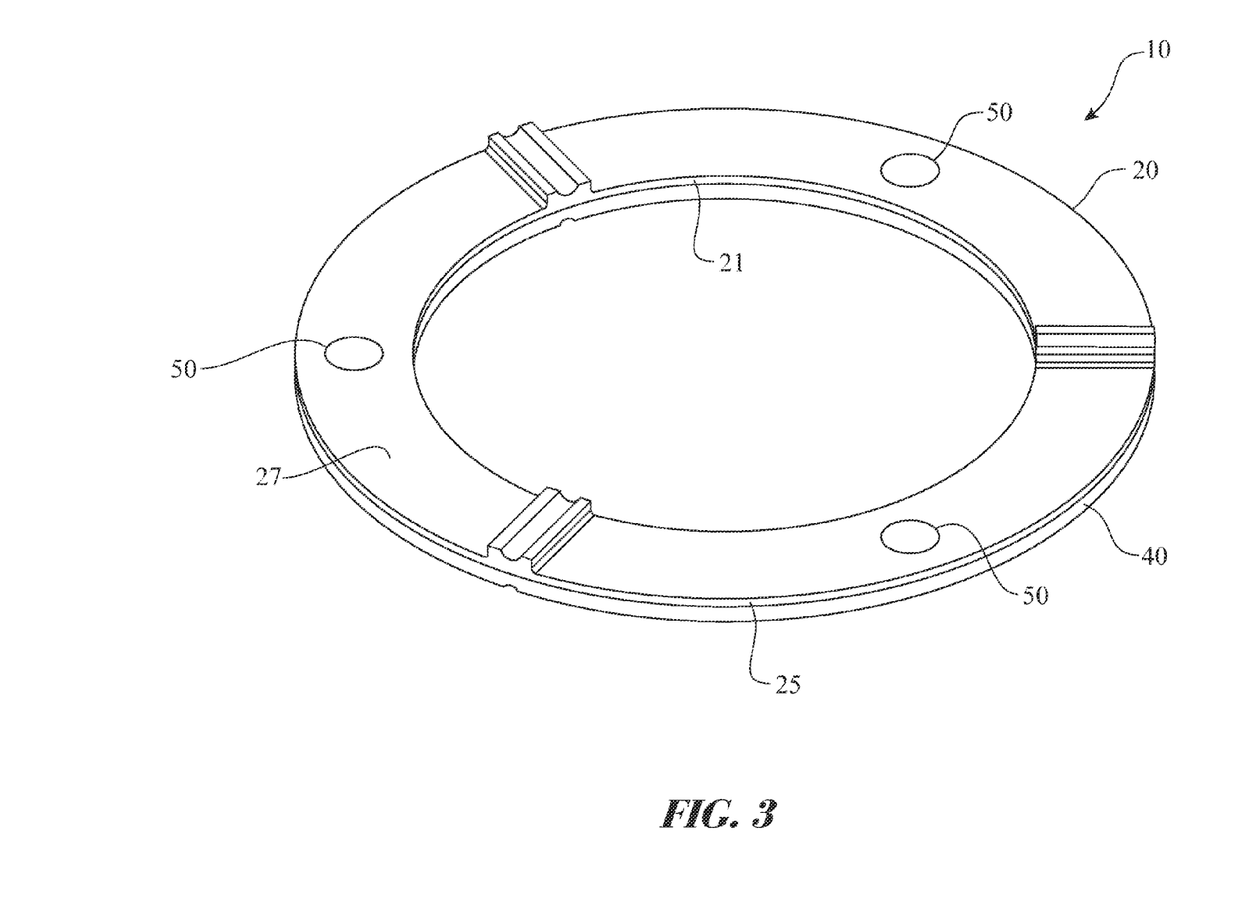
FIG. 3 is an elevated perspective view of the locking thrust washer according to the first preferred embodiment of the present invention.

A first embodiment of a locking thrust washer 10 of the present invention is illustrated in FIG. 3. The locking thrust washer 10 provides a first upper annular ring 20 and a first lower annular ring 40. The first annular rings 20, 40, are assembled together at at least two interlocking junctions 50. The interlocking junctions 50 allow the first upper and lower ring (20, 40) combination to function as the single element thrust washer 10 once interlocked together. The present embodiment of FIG. 3 shows three interlocking junctions 50 provided to form the single interlocking thrust washer 10.

Figure 4:
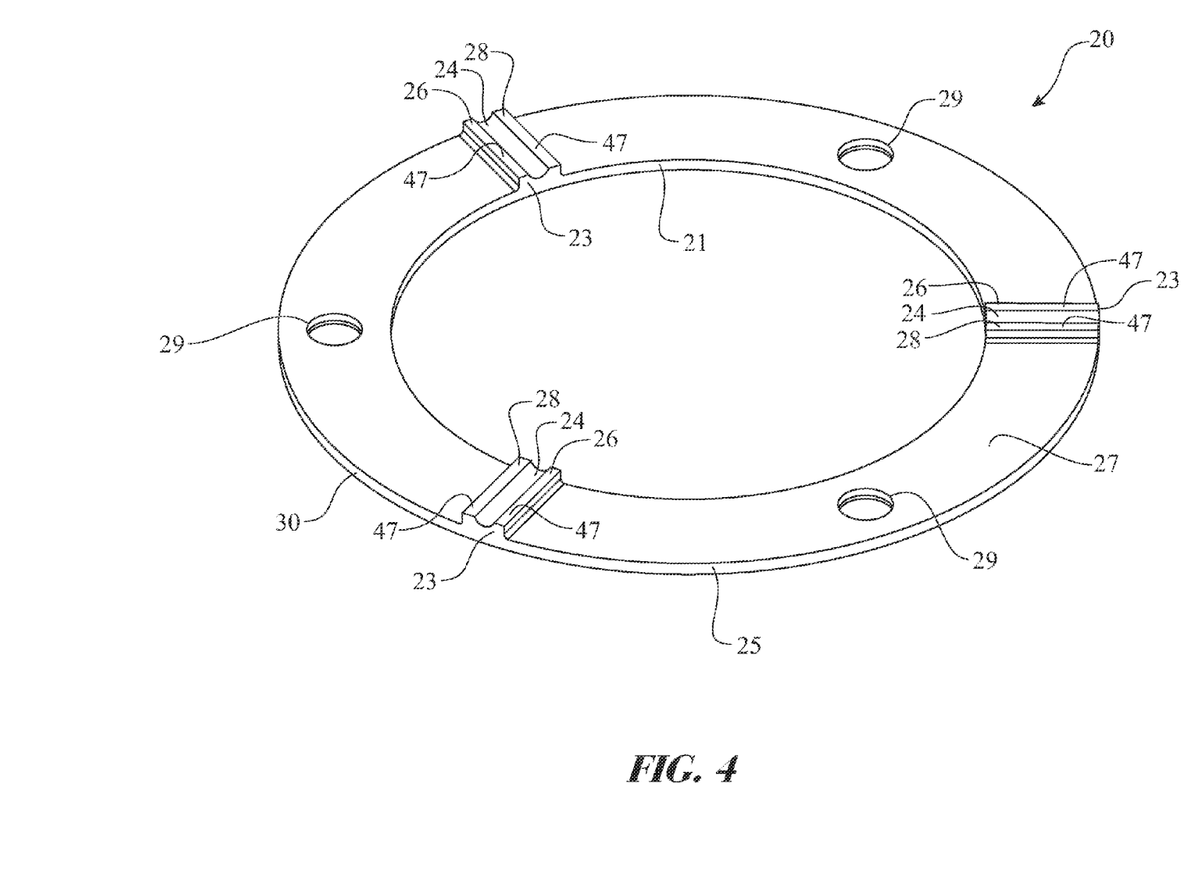
FIG. 4 is an upper elevated perspective view of a first upper annular ring according to the embodiment of FIG. 3.
Figure 5:
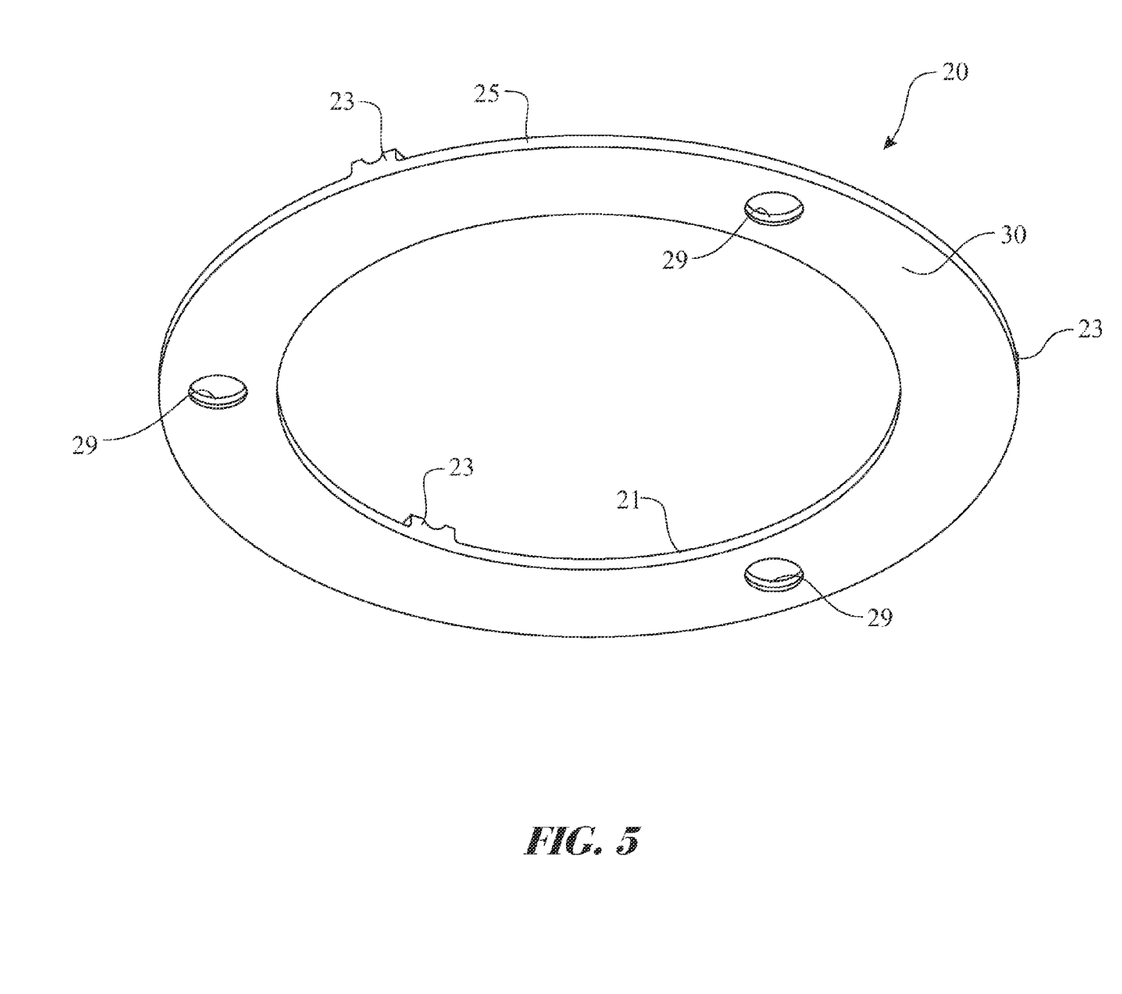
FIG. 5 is a lower elevated view of the first upper annular ring according to embodiment of FIG. 3.

The first upper annular ring 20 is illustrated in FIG. 4. The first upper annular ring 20 includes a first circumferential inner surface 21 and a first circumferential outer side surface 25. The first upper annular ring 20 also provides a first top surface 27 and a first bottom surface 30 opposite to the first top surface 27. FIG. 5 shows the first bottom surface 30 of the upper annular ring 20. The first top and bottom surfaces 27, 30 connect the respective first circumferential inner and outer surfaces 21, 25 together to form the ring 20. Further, there are at least two holes 29 that extend therethrough the first top and bottom surfaces (27, 30). The present embodiment of FIGS. 3-5 shows three holes 29 that extend therethrough first top and bottom surfaces (27, 30).

Figure 6:
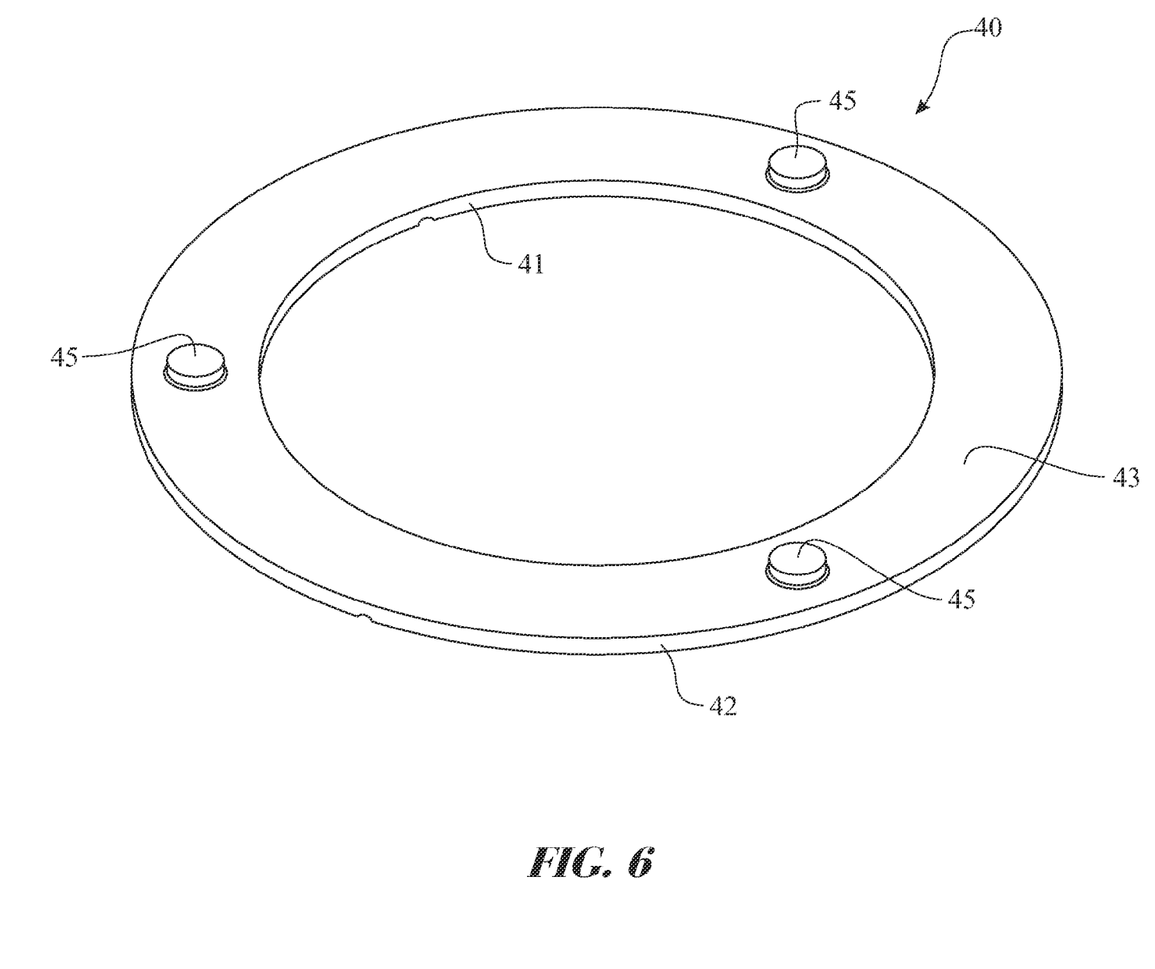
FIG. 6 is an upper elevated perspective view of a first lower annular ring according to the embodiment of FIG. 3.
Figure 7:
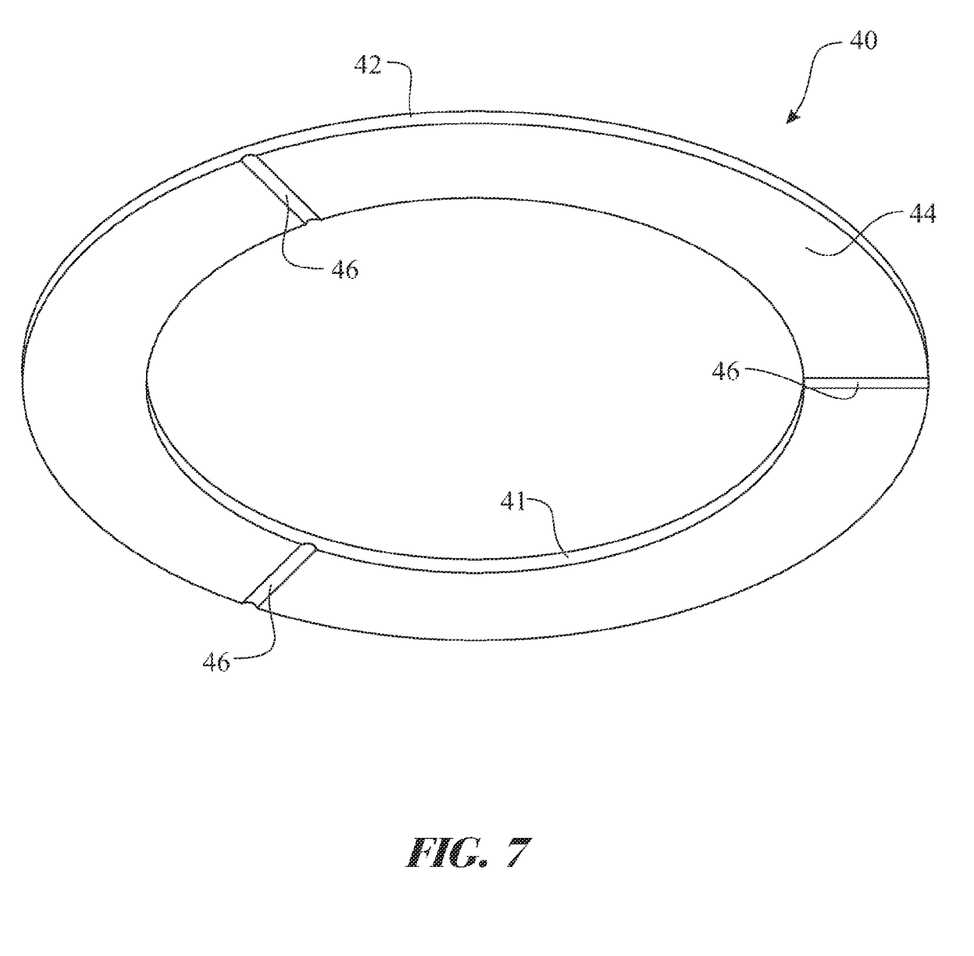
FIG. 7 is a lower elevated perspective view of the first lower annular ring according to the embodiment of FIG. 3.

Referring now to FIGS. 6-7, the first annular lower ring 40 includes a second circumferential inner surface 41 and a second circumferential outer side surface 42. The first lower annular ring 40 also provides a second top surface 43 and a second bottom surface 44 opposite to the second top surface 43. Similar to the upper annular ring 20, the second top and bottom surfaces 43, 44 connect the respective second circumferential inner and outer surfaces 41, 42 together to form the ring 40. The second bottom surface 44 further acts to provide a wearing surface 44. That is, a rotating component such as a bearing (not shown) during operation makes contact with the wearing surface 44. When bathed in lubrication (not shown), the wearing surface 44 provides a relatively low friction contact between the wearing surface 44 and the bearing. A second trough 46 disposed on the second bottom surface 44 of the second annular ring 40 provides an area where lubrication can freely come into contact with, for example the bearing.

The first lower annular ring 40 further includes at least two annular projections or buttons 45 that extend upward from the second top surface (43). The present embodiment of FIG. 6 shows three buttons that extend upwards form the second top surface 43. On assembly, the three buttons align with the three holes 29 to create an interlocking fit 50 between the annular upper and lower rings (20, 40) when pressed together. The interlocking fit 50 also prevents rotation between the two annular rings 20, 40 during operation.

Further, the at least two holes 29 disposed on the first upper annular ring 20 and the at least two annular projections 45 disposed on the first lower annular ring 40 are spaced equidistantly between both the first and second inner and outer surfaces (21, 25), (41, 42) and equidistantly between the first and second top and bottom (27, 30), (43, 44) surfaces respectively. As such, the at least two holes on the upper ring and at least two buttons on the lower ring are radially centered between their respective first and second inner and outer side surfaces. The first upper and lower rings 20, 40 are injection molded and are typically fabricated out of a glass filled nylon material. The first bottom surface 30 and second top surface 43 may either be heat welded, ultrasonically welded, solvent welded and/or press fit together.

The first upper annular ring 20 may further provide at least two standoffs 23 that project upwards form the first top surface 27 of the first upper annular ring 20. The standoffs 23 further include two rectangular projections 26, 28 and a first trough 24 that connects and is disposed between the rectangular projections 26, 28. The rectangular projections 26, 28 also include an outer surface 47. Referring back to the locking thrust washer of FIG. 2, which was referenced in the Background of the Invention, there is shown a gap G that is formed between the first top surface 27 and outer surfaces 47 of the standoff 23. The gap G functions to allow lubricant to flow between the thrust surfaces of the part. In addition, the standoffs lock into mating hardware on one of the thrust surfaces for retention.

Figure 8:
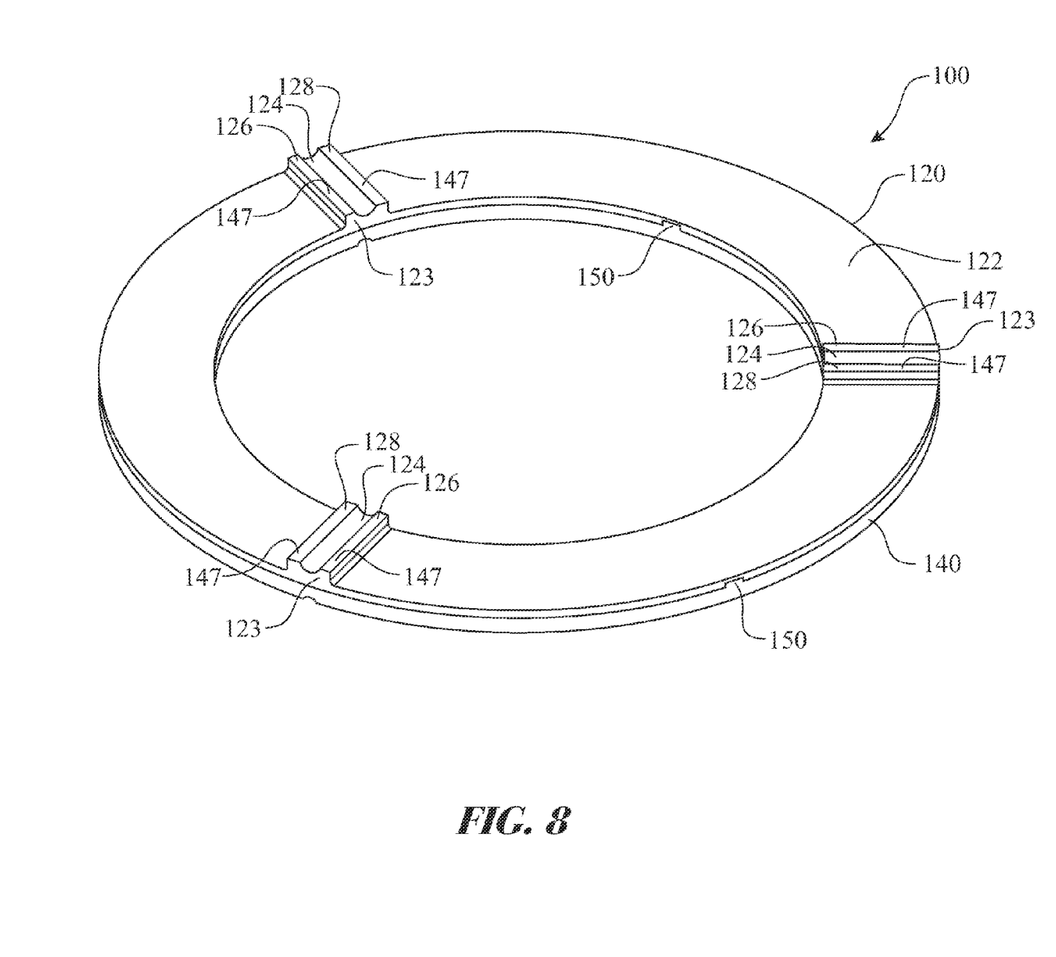
FIG. 8 is an elevated perspective view of the locking thrust washer according to a second preferred embodiment of the present invention.

There is shown in FIG. 8 a second preferred embodiment of a locking thrust washer 100 of the present invention. Locking thrust washer 100 is similar to the embodiment of locking thrust washer 10 with a few differences. Similarly, locking thrust washer 100 provides a second annular upper ring 120 and a second annular lower ring 140. The second annular rings 120, 140 are assembled together at at least two interlocking junctions 150. Here again, the interlocking junctions 150 allow the upper and lower ring (120, 140) combination to function as the single element thrust washer 100 once interlocked together. The present embodiment may include three interlocking junctions 150 provided to form the single thrust washer 100.

Figure 9:
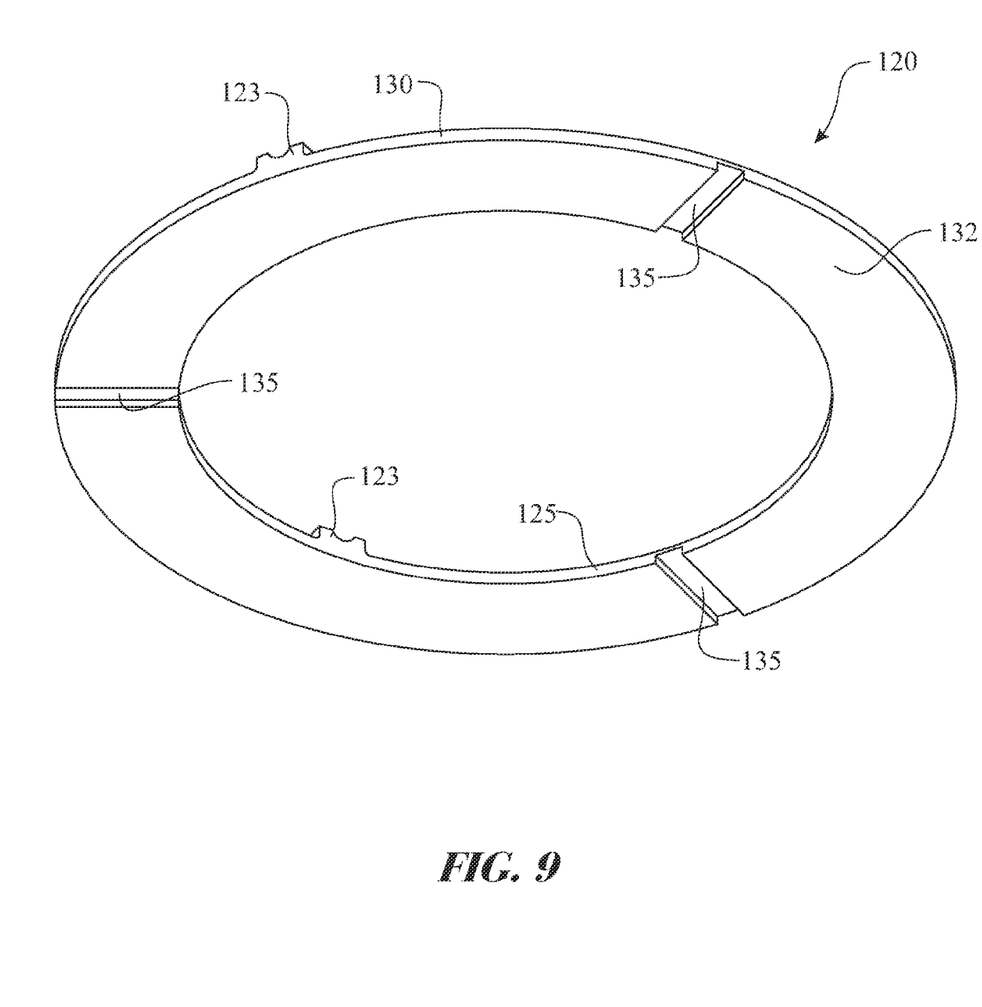
FIG. 9 is a lower elevated view of a second upper annular ring according to embodiment of FIG. 8.

The second embodiment of the second upper annular ring 120 is illustrated in FIGS. 8-9. The second upper annular ring 120 includes a third circumferential inner side surface 125 and a third circumferential outer side surface 130. The upper annular ring 120 also provides a third top surface 122 and a third bottom surface 132 opposite to the first top surface 122. The third top and bottom surfaces 122, 132 connect the respective third circumferential inner and outer surfaces 125, 130 together to form the ring. Further, there are at least two rectangular slots 135 that extend at least partially therethrough the third bottom surface 132. The present embodiment of FIG. 9 shows three rectangular slots 135 that extend between the third inner and outer side surfaces 125, 130.

Figure 10:
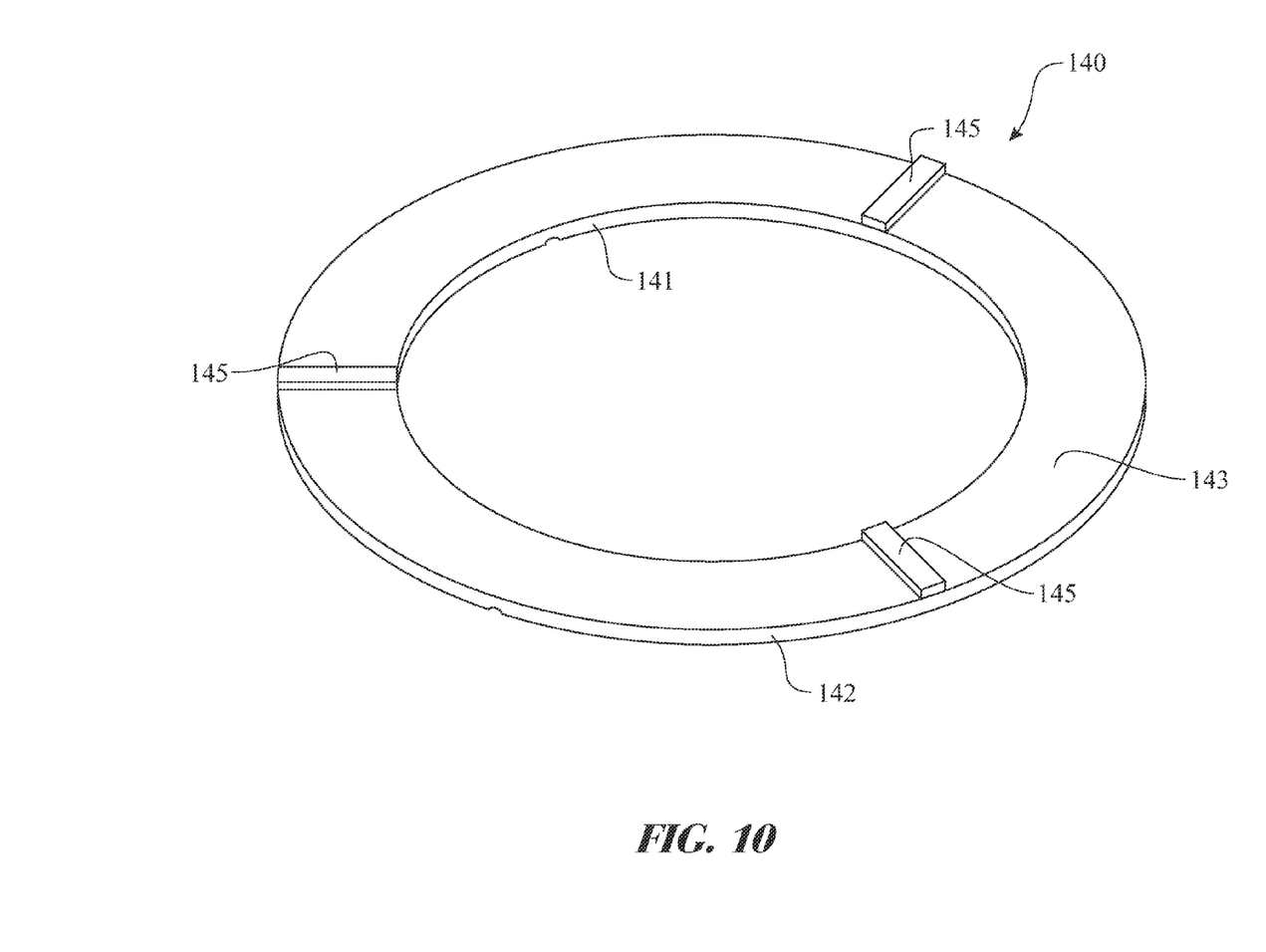
FIG. 10 is an upper elevated view of a second lower annular ring according to embodiment of FIG. 8.
Figure 11:
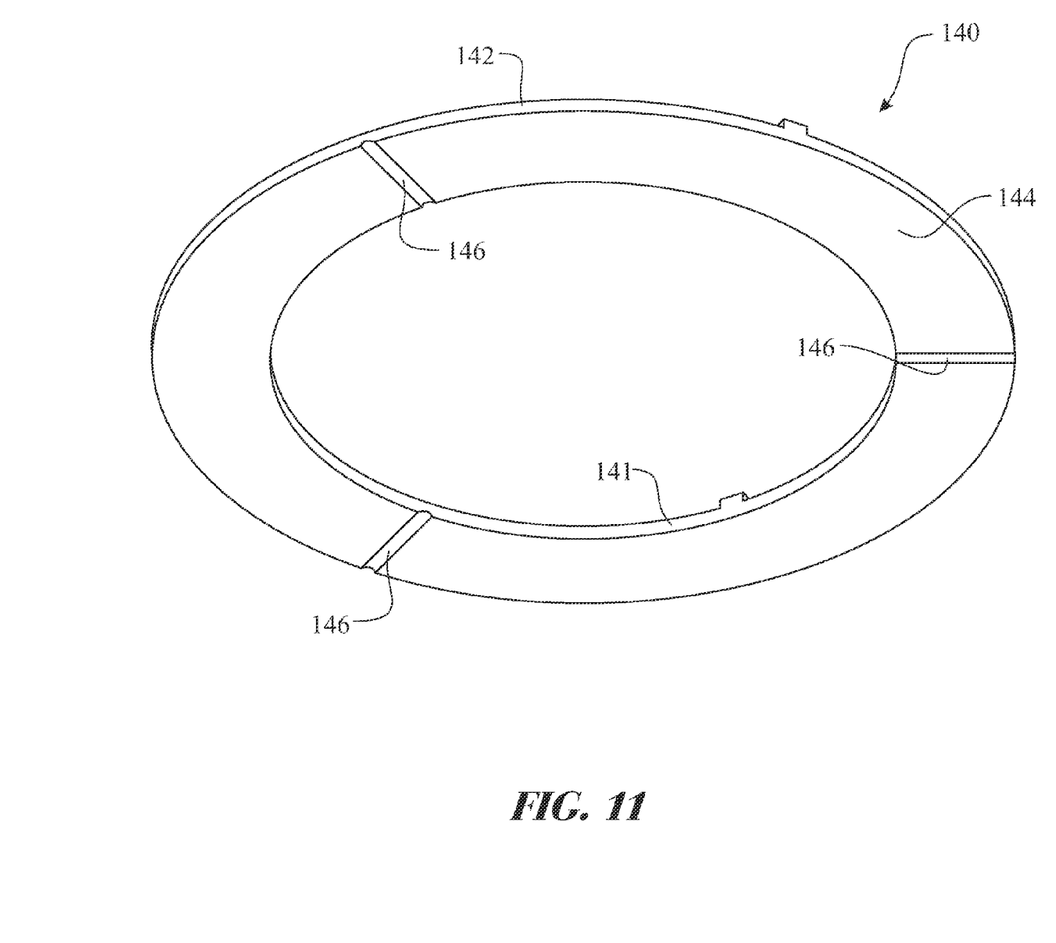
FIG. 11 is a lower elevated view of the second lower annular ring according to embodiment of FIG. 8.

Referring now to FIGS. 10-11, the annular lower ring 140 includes a fourth circumferential inner side surface 141 and a fourth circumferential outer side surface 142. The lower annular ring 140 also provides a forth top surface 143 and a fourth bottom surface 144 opposite to the fourth top surface 143. Similarly to the upper annular ring 120, the fourth top and bottom surfaces 143, 144 connect the respective fourth circumferential inner and outer surfaces 141, 142 together to form the ring. The fourth bottom surface 144 further acts to provide a wearing surface 144. That is, a rotating component such as a bearing (not shown) during operation makes contact with the wearing surface 144. When bathed in lubrication, the wearing surface 144 provides a relatively low friction contact between the wearing surface 144 and for example, the bearing. A fourth trough 146 disposed on the fourth bottom surface 144 of the fourth annular ring 140 provides an area where lubrication can freely come into contact with, for example the bearing.

Further, the annular ring 140 further includes at least two rectangular projections 145 that extend upward from the fourth top surface 143. The present embodiment of FIGS. 10-11 shows three rectangular projections 145 that extend upwards form the fourth top surface 143. On assembly, the three rectangular projections align with the three rectangular slots 135 to create interlocking fit 150 between the annular upper and lower rings 120, 140 when pressed together. The interlocking fit 150 also prevents rotation between the two annular rings 120, 140 during operation of any one of the rotating devices previously disclosed in the Background of the Invention. There is no specific depth required for the slots 135. However, they should be deep enough to engage the rectangular projections 145 such that the two annular rings interlock together sufficiently to prevent their rotation during operation.

Since many modifications, variations, and changes in detail can be made to the five described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A locking thrust washer comprising:
a first annular upper ring having:
first inner and first outer side circumferential surfaces;
first top and first bottom surfaces; and
at least two holes extending there through the first top and first bottom surfaces; and
a first annular lower ring having:
second inner and second outer side surfaces;
second top and second bottom surfaces; and
at least two annular projections extending upward from the second top surface; wherein
the at least two annular projections align with the at least two holes to create an interlocking fit between the first annular upper and first lower rings; wherein
the interlocking fit allows the first upper and first lower rings to combine and function as the single element thrust washer once interlocked together; wherein
the interlocking fit further prevents any rotation between the first upper and first lower annular rings during operation; wherein
wherein the upper annular ring further comprises at least two standoffs for providing a gap; wherein
the standoffs further comprise two rectangular projections and a first trough that connects and is disposed between the rectangular projections.

2. The locking thrust washer according to claim 1, wherein the second bottom surface is a wearing surface.

3. The locking thrust washer according to claim 1, wherein the gap is formed between the first top surface and outer surfaces of the standoff.

4. The locking thrust washer according to claim 1, wherein the at least two holes on the upper annular ring and the at least two annular projections on the lower annular ring are equidistantly spaced apart on their respective first top and first bottom and second top and second bottom surfaces.

5. The locking thrust washer according to claim 1, wherein the at least two holes on the first upper ring and at least two buttons on the first lower ring are radially centered between their respective first and second inner and outer side surfaces.

6. The locking thrust washer according to claim 1, wherein the upper and lower rings are injection molded and fabricated out of a glass filled nylon material.

7. The locking thrust washer according to claim 1, wherein the first bottom surface and second top surface are at least one of heat welded and solvent welded and press fit together.

8. The locking thrust washer according to claim 1, wherein the second bottom surface further comprises at least one second trough for lubrication passage.

9. The locking thrust washer according to claim 1, wherein the thrust washer is injection molded and the thrust washers geometry and volume is designed to not exceed an injection molding machine's shot capacity.

10. A locking thrust washer according to claim 1, further comprising:
    a second annular upper ring having:
        third inner and third outer side surfaces;
        third top and third bottom surfaces; and
        at least two slots at least partially extending radially through the third bottom surface; and
    a second annular lower ring having:
        fourth inner and fourth outer side surfaces;
        fourth top and fourth bottom surfaces; and
        at least two rectangular projections at least partially extending upward from the third top surface; wherein
    the at least two rectangular slots align with the at least two rectangular projections to create an interlocking fit between the annular upper and annular lower rings; and wherein
    the interlocking fit allows the two ring assembly to function as a single element thrust washer once installed.

\* \* \* \* \*